April 12, 1960   W. J. TANCIG   2,932,779
TIME INTERVAL DEVICE
Filed Dec. 31, 1954   2 Sheets-Sheet 1
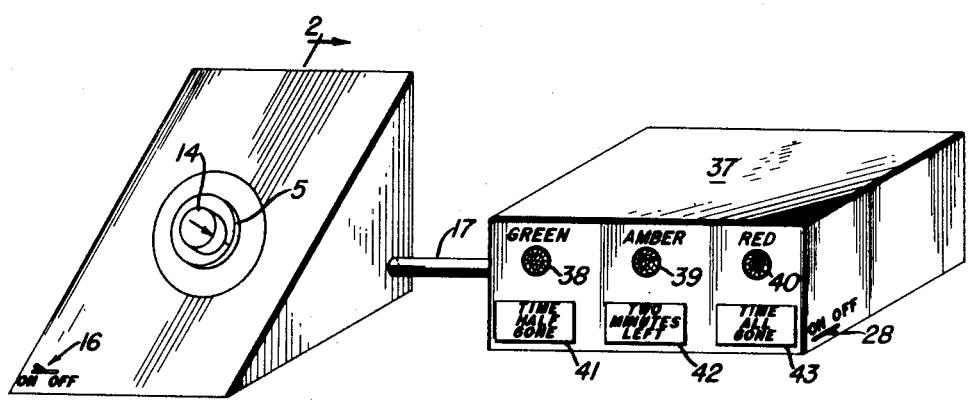
Fig. 1
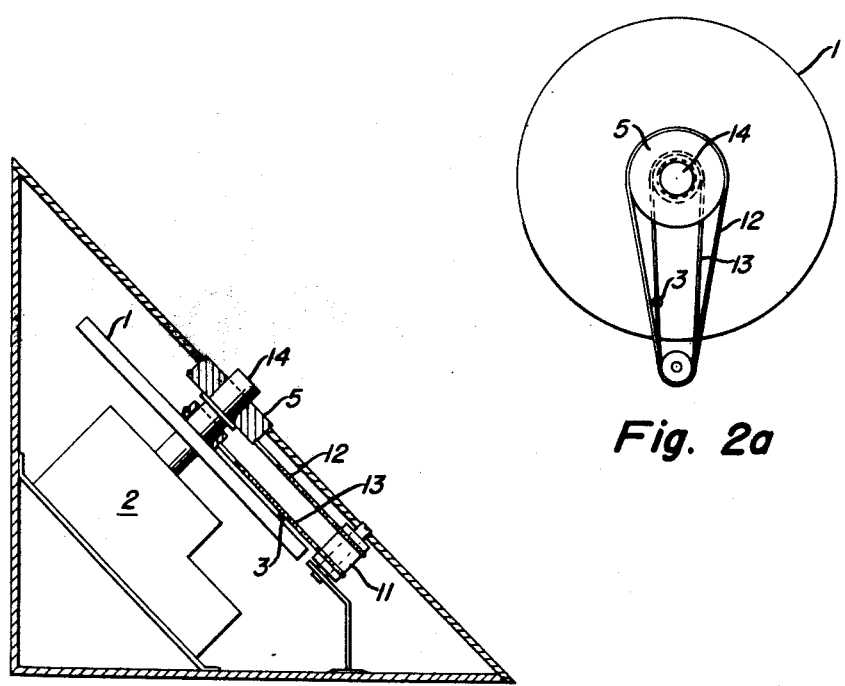
Fig. 2a
Fig. 2
INVENTOR.
William J. Tancig
BY
*Donald E. Payne*
ATTORNEY April 12, 1960     W. J. TANCIG     2,932,779
TIME INTERVAL DEVICE
Filed Dec. 31, 1954     2 Sheets-Sheet 2
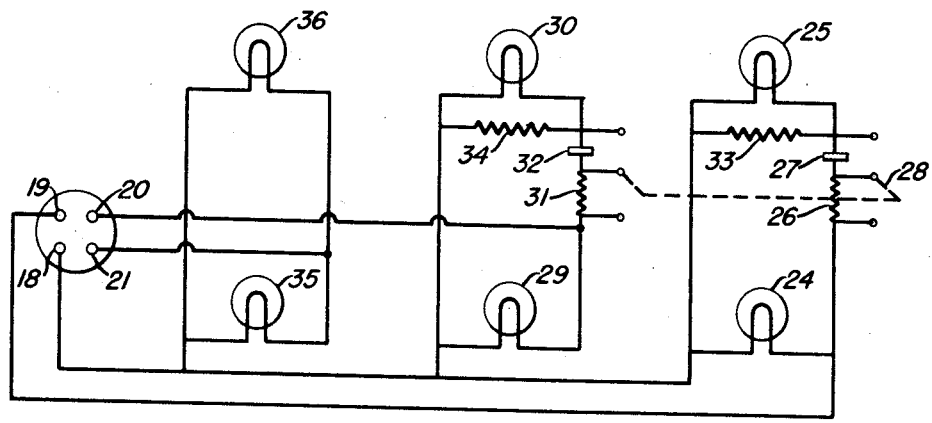
*Fig. 4*
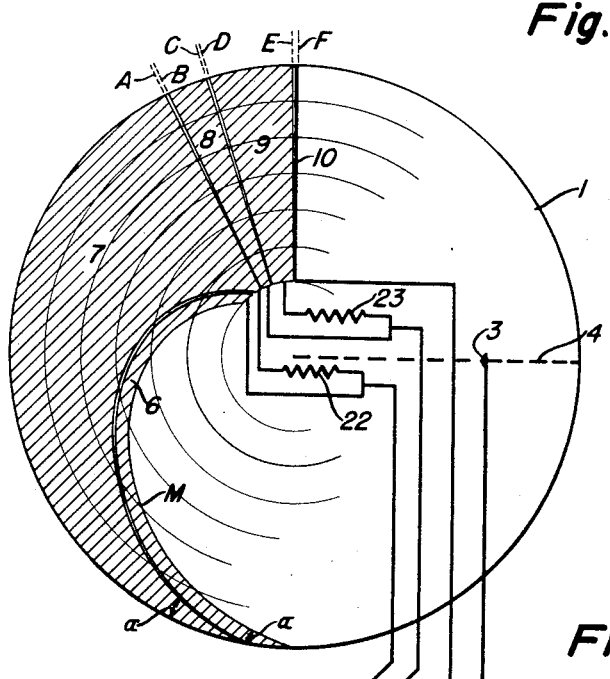
*Fig. 3*
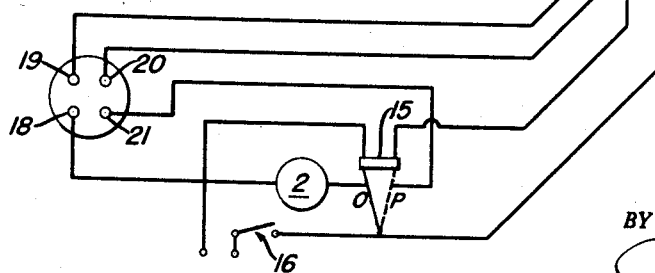
INVENTOR.
William J. Tancig
BY
*Donald E. Payne*
ATTORNEY

United States Patent Office 2,932,779
Patented Apr. 12, 1960

2,932,779

TIME INTERVAL DEVICE

William J. Tancig, Dyer, Ind., assignor to Standard Oil Company, Chicago, Ill., a corporation of Indiana Application December 31, 1954, Serial No. 478,965

10 Claims. (Cl. 318—466)

This invention relates to a time interval device, and it pertains more specifically to an improved method and means for measuring and/or indicating the lapse of an allotted amount of time, and one or more fractional portions thereof.

Heretofore, it has been customary when indicating the lapse of a pre-selected time interval to use a timing device which would indicate by means of a light, bell or other indicator, the expiration of the time interval. In instances wherein it has been desirable to indicate that a fixed portion of the time interval remains, it has also been customary to have the timing device indicate this period. In the event that it was necessary that a percentage or fractional portion of the time interval be indicated, either a second timing device was necessary or reference had to be made to a clock, or the like. A primary object of this invention is to overcome the necessity of referring to, or using, other indicators or timing devices and to provide a novel method and means for automatically indicating the lapse of a fractional portion, and the entirety, of a pre-selected time interval. A further object is to provide a novel method and means for automatically indicating when half of a pre-selected time interval has lapsed. Still another object is to provide an apparatus of simple and rugged construction which may be easily set to indicate the lapse of one or more fractional portions of a pre-selected time interval. Yet another object is to provide a method and means to indicate the lapse of one or more fractional portions and the lapse of all but a few minutes of a pre-selected time interval. A more specific object is to provide a method and means to indicate the mid-point and also a fixed period before the end of an allotted amount of time. A still more specific object is to provide a method and means to indicate that half of an allotted amount of time has lapsed, that only two minutes remain and that the allotted amount of time has completely lapsed. An additional object of this invention is to provide a method and means to indicate that half of an allotted amount of time has lapsed, that the second half of the allotted time is running, that only two minutes remain, that the last two minutes are running and that the allotted amount of time has lapsed.

Another object of this invention is to provide a method and means which may be used in conjunction with analytical equipment, or the like, to control or operate said equipment. One example of this is in carrying out a common distillation for which it is often desirable to alter the heat input to the reboiler after a fractional portion of a selected time interval has lapsed. Yet another example is to control the heat input to a furnace. Often it is desirable when drying or calcining compounds in a furnace, to alter the temperature after the lapse of a fractional portion of a selected time interval. Thus, once it has been established, for example, that the heat input to a furnace should be increased after the lapse of one-third of a time interval and then decreased at the end of two-thirds of said time interval, a device may be provided as hereinafter described to accomplish this object. These and other objects of my invention will become apparent to those skilled in the art as the description thereof proceeds.

A feature of the invention is that a device is provided which may be set by two simple adjustments corresponding to a pre-selected time interval so that it will indicate to a speaker that half of his speaking time has elapsed, that the second half of his allotted time is running, that he has only two minutes remaining, that the last two minutes are running and that his speaking period has completely lapsed. This is accomplished with a device comprising an electrically non-conducting disc which is rotated by means of an electric motor and having bonded to its surface, five electrically conducting plates. An electrical contact is slidably mounted to bear against the surface of the disc and may be positioned to correspond to different time intervals. The two simple adjustments hereinbefore referred to permit movement of the electrical contact to correspond to a selected time interval and permit rotating the disc in a direction contrary to that imparted to it by the motor to a position corresponding to the selected time interval. Also provided are indicators and appropriate electrical circuits for energizing the indicators when the electrical contact engages the electrically conducting plates, and a switch means and circuit for operating said switch means to stop the rotation of the disc when the electrical contact engages the fifth electrically conducting member. Further details and advantages of my device are described in connection with the accompanying drawings wherein:

Figure 1 is an isometric drawing of the entire system;

Figure 2 is a cutaway section of the timing means;

Fig. 2a is a projection of the disc and pulley means;

Figure 3 is a schematic representation of the timing means; and

Figure 4 is a circuit diagram of the indicator means.

In the example described and referring to Figure 2, a disc 1 is rotated by a constant speed motor 2. A sliding contact 3 is shown which may be moved back and forth on radial line 4 by means of the contact positioner 5.

In Figure 3, a sectional layout of the disc is shown and a schematic representation of the remainder of the timing means is given. The body of the disc 1 is made of a non-conductive material such as plastic, or the like. The disc contact plates 6, 7, 8, 9 and 10, which are made of a conducting material such as copper, are attached permanently to the disc. In addition, a slidable contact 3 is mounted so that it may be positioned to correspond to selected time intervals by means of the contact positioner 5 in conjunction with the double pulley 11 and pulley cables 12 and 13. Disc position indicator 14 is provided to adjust the positioning of the disc as hereinafter described to correspond to a pre-selected time interval. An end position solenoid switch 15 is also provided which is actuated when the electrical contact engages the fifth electrically conducting member 10. A switch 16 is provided to turn the device on and off.

The first of the five electrically conducting plates 6 is a narrow strip of decreasing width forming an acute angle $\alpha$ with the edge and curving inwardly toward the center of the disc. The second electrically conducting plate 7 covers the area bounded by the first electrically conducting strip 6, the edge of the disc and radial line A. The third electrically conducting member 8 is a narrow strip of decreasing width extending across the surface of the disc at right angles to a line tangent to the edge of the disc, toward the center of the disc and is bounded by radial lines B and C. The fourth electrically conducting member 9 is also a narrow strip extending across the disc at right angles to a line tangent to the edge of the disc, toward the center of the disc and is bounded by radial lines D and E. The fifth electrically conducting member 10 which may be a strip, bar, wire, or the like, extends along radial line F.

The locus of the line represented by the curved edges of contact plates 6 and 7 may be obtained using the following expression:

$$X_Y = 360Y/Z(1-T)$$

wherein:

$Z$ = the longest total time interval which is to be measured and/or indicated (in this example, 40 minutes);

$Y$ = a time increment less than, or equal to, Z which is to be measured and/or indicated by the device;

$T$ = the fractional portion of the allotted amount of time which is to be measured and/or indicated; and $X_Y$ = the distance in degrees proceeding counter-clockwise from radial line F in Figure 3 along an arc of a circle concentric with the circle representing the disc and corresponding to the time increment Y.

Thus, the locus of the line representing the leading curved edge M of contact plate 6 which is a narrow strip of decreasing width forming an arcute angle α with the edge and curving inwardly toward the center of the disc, and which first engages electrical contact 3, is calculated as follows:

$$X_Y = 360Y/Z(1-T)$$
$$X_{10} = 360 \times (10/40) \times (1-0.5) = 45.0°$$
$$X_{15} = 360 \times (15/40) \times (1-0.5) = 67.5°$$
$$X_{20} = 360 \times (20/40) \times (1-0.5) = 90.0°$$
$$X_{25} = 360 \times (25/40) \times (1-0.5) = 112.5°$$
$$X_{30} = 360 \times (30/40) \times (1-0.5) = 135.0°$$
$$X_{35} = 360 \times (35/40) \times (1-0.5) = 157.5°$$
$$X_{40} = 360 \times (40/40) \times (1-0.5) = 180.0°$$

Concentric circles representing the various time intervals may be drawn on the disc or a template and the above points marked and a curved line drawn representing the lapse of one-half of the time intervals. The spacing of the concentric circles representing the various time intervals which are to be measured and/or indicated, is not critical. It is convenient, however, to use as small a disc as possible and to utilize a maximum amount of the surface. Accordingly and as shown in Figure 3, a circle representing the longest time interval to be measured and/or indicated is as close to the edge of the disc as is practical and yet, permits electrical contact 3 to engage the contact plates without slipping off the edge of the disc; and the circle representing the shortest time interval, the lapse of which is to be measured and/or indicated is as close to the center as is practical. The width of contact strip 6 in degrees may be determined by dividing the time increment in minutes it is to represent by the time in minutes it takes for the disc to make one revolution and multiplying by 360 degrees. In the example described, contact strip 6 represents 45 seconds and the time for one complete revolution of the disc is 40 minutes; therefore the width of contact strip 6 is 360 (0.75/40) or 6.67°. Thus the disc or template may be marked 6.67° along the concentric circles and following the locus representing the leading edge M of contact strip 6 and a line drawn representing the rear edge of contact strip 6. The locus representing the leading edge of contact plate 7 may be obtained by substituting the proper value for Y in the expression $$X_Y = 360Y/Z(1-T)$$

or more conveniently, by placing it parallel to and as close as practical to the rear edge of contact strip 6. The width in degrees of contact plates 8 and 9 are calculated as described with respect to contact strip 6. Hence, the width in degrees of contact plate 8 is 6.67° and contact plate 9 is 18° inasmuch as they represent time intervals of 45 seconds and two minutes respectively. As will be hereinafter described, the expression $$X_Y = 360Y/Z(1-T)$$

is applicable for calculating loci representing any fractional portion of a selected time interval, such as ¼, ⅓, ¾, ⅔, etc., or combinations thereof.

In Figure 1 a four-conductor cable 17 is shown which connects the timing device and the indicator means. Conductor 18 is common to all of the indicator lights and is connected to one side of the voltage supply source. Conductor 19 in the timing device is attached directly to contact plate 6. Contact plate 7 is also connected to conductor 19 through a voltage dropping resistor 22. Conductor 20 attaches directly to contact plate 8 and indirectly to contact plate 9 through a voltage dropping resistor 23. Conductor 21 is connected to the end position solenoid switch 15. In the circuit diagram of the indicator means, Figure 4, conductor 18 is connected in parallel to one side of all the indicator lights. Conductor 19 is connected directly to the other side of indicator light 24 and indirectly to the other side of indicator light 25 through a voltage dropping resistor 26 or a thermally activated blinking means 27. The double pole-double throw switch 28 permits one to make a selection between a blinking indicator and an indicator of reduced intensity. Conductor 20 is connected directly to indicator light 29 and indirectly to indicator light 30 through resistor 31 or blinking means 32. Switch 28 is also attached to this circuit to permit selection of blinking indicators or indicators of reduced intensity. Resistors 33 and 34 are connected in parallel with indicator lights 25 and 30 respectively to produce a current flow through blinking means 27 and 32 which will result in an optimum blinking rate. One side of indicator lights 35 and 36 are connected in parallel to conductor 21. The indicating circuits of Figure 4 are housed in cabinet 37, Figure 1. Indicator light 25 is positioned directly behind the green jewel 38, indicator light 30 is positioned directly behind the amber jewel 39, and indicator light 35 is positioned directly behind the red jewel 40. Indicator lights 24, 29 and 35 are positioned respectively behind the translucent panels marked "Time Half Gone" 41, "Two Minutes Left" 42, and "Time All Gone" 43.

The device operates as follows: The On-Off switch 16 is set to the "On" position, thus energizing the entire system. Solenoid switch 15 is in the O position unless electrical contact 3 is in contact with element 10 in which case the disc will have to be moved by disc positioner 14 to energize the motor 2. The proper time for a particular speech, interval, or the like; for example, 30 minutes, is selected by turning contact positioner 5, to a precalibrated position corresponding to a 30 minute time interval. The disc is then rotated by means of the disc positioner 14 to the same time setting, i.e. 30 minutes. This results in rotating the disc in the opposite direction to which the motor rotates it to a point which is twice the distance covered by all the metal contact plates at the 30-minute setting. To illustrate this setting, for the first half of the 30-minute period, the sliding contact at the 30-minute setting would be contacting the non-conducting portion of the disc and for the other half of the 30-minute period, the contact would be sliding over the conducting portions of the disc. Thus, after 15 minutes, sliding contact 3 would engage contact plate 6 energizing indicator lights 24 and 25 through conductor 19. Accordingly, the "Time Half Gone" sign 41 would be illuminated and, depending upon the positioning of switch 28, the green jewel 38 would be seen to blink or glow. The intensity of this light may be regulated by selection of the proper wattage indicator light or, very conveniently, by placing a resistor in series with the light. After sliding contact 3 has crossed over conducting plate 6 and engaged conducting plate 7, series resistor 22 is connected in the circuit. The size of this resistor is selected to drop the voltage just enough to cause the blinking means 27 to become inoperative. Thus, indicator light 25 is effectively removed from the circuit and only indicator light 24 is energized, although at a reduced intensity. The width of contact plate 6 is selected to permit energizing the blinker means and indicator light 25 for about 45 seconds, thus a speaker, or the like, is warned that half of his allotted time has elapsed and upon the expiration of the blinking light and the resulting reduced intensity of the "Time Half Gone" sign 41, he is made aware that he is in the second half of his allotted time period. At the end of 12 minutes and 15 seconds, or conversely, two minutes and 45 seconds before the end of this or any other selected time period, sliding contact 3 leaves contact plate 7 and engages contact plate 8. This de-energizes indicator light 24 and causes the "Time Half Gone" sign 41 to go off and energizes indicator lights 29 and 30 through conductor 20. The circuits comprising resistors 31 and 34 and the blinking means 32 cause indicator light 30 to blink or glow at reduced intensity in the same fashion as was described in connection with indicator light 25. Contact plate 8 is also of such a width as to cause contact with the sliding contact 3 for 45 seconds. As the sliding contact leaves contact plate 8 and engages contact plate 9, voltage dropping resistor 23 is cut into the circuit thereby causing blinker 32 to become inoperative and to dim indicator light 29, thus causing the "Two Minutes Left" sign 42 to glow at reduced intensity. Contact plate 9 is of such a width as to cause contact with sliding contact 3 for two minutes. At the end of this two-minute period, sliding contact 3 leaves contact plate 9, thus denergizing indicator light 29 and causing the "Two Minutes Left" sign 42 to go off. Sliding contact 3 then engages the contacting member 10; this energizes solenoid switch 15 moving it to the P position and causes motor 2 to stop which stops the rotation of disc 1, and energizes indicator lights 35 and 36 through conductor 21. Red jewel 40 and the "Time All Gone" sign 43 are thus illuminated. The "Time All Gone" light will remain on until the timer is reset or the apparatus is turned off with On-Off switch 16.

Although the invention has been described with respect to a specific speaker indicator timer useful for indicating time intervals in the range of 10 to 40 minutes, it is within the scope of this invention to provide devices with various time interval ranges by making suitable changes, such as decreasing the rotational speed or increasing the diameter of the disc, or combinations thereof. Although the specific embodiment described indicates the lapse of half of a selected time interval, it is also within the scope of this invention to provide a device which will indicate the lapse of any percentage portion of a time interval. For instance, if it is desirable to indicate the lapse of one-third of a selected time interval, it may be accomplished by proper selection of rotational speed of the disc, properly calibrating the disc positioner 14 to correspond to the desired time intervals, and providing electrical contact plates corresponding to plates 6 and 7 whose curved edges are represented by the locus obtained with the expression as hereinbefore set forth:

$$X_Y = 360Y/Z(1-T)$$

Thus, for a device which will indicate and/or measure the lapse of time intervals in the range of one-half to two hours and the lapse of one-third of said intervals, a disc speed of one-half revolution per hour would be chosen and the leading edge of the conducting plate representing the lapse of one-third of the time interval would be obtained as follows:

$$X_Y = 360Y/Z(1-T)$$

$X_{30} = 360 \times (30/120) \times (1-0.33) = 60°$
$X_{45} = 360 \times (45/120) \times (1-0.33) = 90°$
$X_{60} = 360 \times (60/120) \times (1-0.33) = 120°$
$X_{75} = 360 \times (75/120) \times (1-0.33) = 150°$
$X_{90} = 360 \times (90/120) \times A1-0.33) = 180°$
$X_{105} = 360 \times (105/120) \times (1-0.33) = 210°$
$X_{120} = 360 \times (120/120) \times (1-0.33) = 240°$ Concentric circles representing the intervals from 30 to 120 minutes are then drawn on the disc, or a template, and the above points marked and a curved line representing the lapse of one-third of the time intervals in the range of one-half to two hours is drawn. A conducting element conforming to this locus is then bonded to the surface.

Loci representing any fractional portion may be obtained by substitution in the expression given hereinbefore.

A device may also be provided according to the invention to indicate the lapse of a plurality of fractional portions of a selected time interval. For instance, a first electrical contact plate may be provided as hereinbefore described which would indicate the lapse of one-third of the selected time interval and a second contact plate could be provided which would indicate the lapse of one-half of the selected time interval. Proper placement of these contact plates on the disc, in conjunction with the proper selection of rotational speed of the disc and calibration of the disc positioner, would provide a device which would indicate the lapse of one-third and one-half of the selected time interval. Additional plates could be provided to indicate the lapse of any fractional portion of the selected time interval. It is also within the scope of this invention to incorporate additional fixed time interval plates, such as plates 8 and 9, in conjunction with the intervals as heretofore described. The use of lights as indicating means is by way of example only; indicating means, such as buzzers, bells, and the like, may be used.

Although the time interval device has been described with respect to its use as a speaker's indicator timer, this is by way of example only. The device may be used for any purpose wherein it is desirable to indicate the lapse of a fractional portion of a time interval. For instance, it may be used as heretofore described in conjunction with equipment, such as distillation columns, furnaces, or the like, to indicate that such distillation, reaction, heating period, or the like, has progressed to the extent of one-quarter, one-half, three quarters, or any desirable fractional portion.

The device may also be used to control process variables, such as heat input to a reboiler, furnace or the like. For example, and as pointed out previously, it may be desirable, when drying or calcining compounds in a furnace, to alter the temperature after the lapse of a fractional portion of a selected time interval. This may be accomplished by replacing the indicator light circuits with various heating elements or, if necessary, by replacing the indicator light circuits with relays which will in turn operate heating elements. Thus, once it has been established, for example, that it is necessary to increase the heat input to a furnace after the lapse of one-half of a time interval and then decrease the heat input for the last two minutes of the interval, appropriate heating elements in the furnace may be operated successively from contact plates 7 and 9. If desirable, indicator light may be operated in parallel with the heating elements as previously described to visually indicate the portion of time which has elapsed.

It is further contemplated that modifications and revisions of the illustrated embodiments can be made by those skilled in the art without departing from the scope of the described invention.

What I claim is:

1. A time interval indicating device which comprises: an electrically non-conducting disc; a first electrically conducting strip attached to said disc at an acute angle to the edge of said disc and curving inwardly toward the center of said disc; a second electrically conducting surface attached to said disc and covering the area bounded by said first electrically conducting strip, the edge of said disc and a radial line; a third electrically conducting strip bounded by the edge and radial lines of said disc and adjacent to said second electrically conducting surface; a fourth electrically conducting strip bounded by the edge and radial lines of said disc and adjacent to said third electrically conducting strip; a fifth electrically conducting strip of narrow width extending radially from the edge toward the center of said disc adjacent to said fourth electrically conducting strip; an electrical contact mounted to bear against said surface and slidable along a radial line of said disc; mounting means for said electrical contact; means for rotating said disc at a constant rate of speed to an end position corresponding to the engagement of said electrical contact with said fifth electrically conducting strip; means for rotating the disc in a direction opposite to the direction imparted by said constant speed means to a position wherein the angular distance to the end position corresponds to a pre-selected time interval; means for positioning said electrical contact to correspond to said pre-selected time interval; and electrical control means for said constant speed means, said control means including switch means and said electrical contact, adapted to stop said constant speed means when said electrical contact engages said fifth conducting strip.

2. A time interval device which comprises: a member having a disc-like plane surface including an edge and a center, which surface is composed of at least one electrically non-conducting portion and at least one electrically conducting portion, with a line of junction between said conducting portions forming an acute angle with said edge and curving inwardly toward said center; at least one electrical contact mounted to bear against said surface, only one electrical contact capable of closing an electrical circuit with said electrically conducting portion; electrical contact mounting means; driving means for producing relative motion at constant angular velocity between said surface and said circuit-closing contact whereby said circuit-closing contact traces a path on said surface from a variable initial position to a fixed end position along the arc of a circle having as its center the center of said surface; and means for positioning said circuit-closing contact at a pre-determined angular distance from said end position, said angular distance corresponding to a preselected time interval.

3. A device for measuring the lapse of fractional portions of time intervals which comprises: a member having a disc-like plane surface including an edge and a center, which surface is composed of at least one electrically non-conducting portion and at least one electrically conducting portion, wherein the line of junction between said portions is represented by the expression:

$$X_Y = 360Y/Z(1-T)$$

wherein:

$Z$ = the longest total time interval which is to be measured;
$Y$ = a time increment less than, or equal to, $Z$ which is to be measured;
$T$ = the fractional portion of the allotted amount of time which is to be measured; and
$X_Y$ = distance in degrees along the arc of a circle representing the time increment $Y$, from a line extending from the center to the edge of the surface and representing the end of the time intervals;

an electrical contact mounted to bear against said surface; electrical contact mounting means; driving means for producing relative motion at constant angular velocity between said surface and said circuit-closing contact whereby said circuit-closing contact traces a path on said surface from a variable initial position to a fixed end position along the arc of a circle having as its center the center of said surface; and means for positioning said circuit-closing contact at a predetermined angular distance from said terminal position, said angular distance corresponding to a preselected time interval.

4. A time interval dividing device which comprises a rotatable element including a circular edge upon said element, said element rotatable about an axis coincident with the center of a circle to said circular edge, which element is composed of at least one electrically non-conducting portion and an electrically conducting portion with a line of junction between said portions forming an acute angle with said edge, at least one electrical contact mounted on a cable to bear against the surface of said element, said cable being linearly adjustable along a path substantially perpendicular to said circular edge for positioning said electrical contact in pre-selected positions along the linear adjustment of said cable, and driving means for producing relative motion at constant angular velocity between said element and said contact whereby said contact traces a curvilinear path on said surface.

5. A time interval dividing device which comprises a rotatable element including a circular edge upon said element, said edge being defined by a point rotated about the axis of rotation of said rotatable element in a plane substantially perpendicular to said axis, which element is composed of at least one electrically non-conducting portion and at least one electrically conducting portion with a line of junction between said portions forming an acute angle with said edge, a cable mounted substantially parallel to said rotatable element and substantially perpendicular to said circular reference edge on said rotatable element, an electrical contact affixed to said cable and mounted to bear against the surface of said rotatable element, means for linearly moving said cable in a path substantially perpendicular to said circular reference edge with said electrical contact mounted to bear against said surface, and driving means for producing relative motion at constant angular velocity between said element and said electrical contact whereby said electrical contact traces a curvilinear path on said surface.

6. A time dividing device which comprises a rotatable planar element including an electrically conducting portion, an electrically non-conducting portion and a curvilinear reference edge defined by a point rotating about the axis of rotation of said rotatable planar element in a plane substantially perpendicular to said axis, said electrically conducting portion comprising an electrically conducting segment having a line of conjunction with said electrical non-conducting portion represented by the expression:

$$X_Y = 360Y/Z(1-T)$$

wherein:

$Z$ = the longest total time interval which is to be measured;
$Y$ = a time increment less than, or equal to, $Z$ which is to be measured;
$T$ = the fractional portion of the allotted amount of time which is to be measured; and
$X_Y$ = distance in degrees along the arc of a circle representing the time increment $Y$, from a line extending from the center to the edge of the surface and representing the end of the time intervals;

a pulley cable mounted substantially parallel to said rotatable element and substantially perpendicular to said circular reference edge on said rotatable surface, a movable electrical contact affixed to said cable and mounted to bear against the surface of said rotatable planar element, means for linearly moving said cable and contact in a path substantially perpendicular to said curvilinear reference edge with said movable electrical contact mounted to bear against said surface, and driving means for producing relative motion at constant angular velocity between said element and said electrical contact whereby said electrical contact traces a curvilinear path over said surface.

7. The time dividing device of claim 6 wherein said means for linearly moving said cable comprises a knob, a continuous pulley cable mounted in working contact with said knob, a double co-axial pulley in working contact with said continuous pulley cable, said double pulley being capable of moving said contact toward and from said reference edge by rotation of said knob.

8. The device of claim 5 wherein the electrically conducting portion comprises a first electrically conducting narrow strip of decreasing width curving inwardly from said reference edge toward said axis and a second electrically conducting strip bounded by radial lines extending from said axis to said reference edge and positioned between said first strip and an end position corresponding to completion of said relative motion.

9. The device of claim 8 in which the electrically conducting portion includes a third electrically conducting narrow strip extending radially from said axis toward said edge and positioned on a radial line corresponding to said end position, and electrical control means for said driving means, said control means including switch means and said electrical contact and being adapted to stop said driving means when said switch is actuated by the engagement of said electrical contact with said third strip.

10. The device of claim 9 in which said electrically conducting portion includes an electrically conducting surface within the area bounded by said first strip and said second strip and said reference edge.

References Cited in the file of this patent

UNITED STATES PATENTS

| | | |
|---|---|---|
| 445,341 | Striemer | Jan. 27, 1891 |
| 885,953 | Ragan | Apr. 28, 1908 |
| 900,529 | Hansen | Oct. 6, 1908 |
| 1,121,025 | Krieger | Dec. 15, 1914 |
| 1,320,580 | Somerville | Nov. 4, 1919 |
| 1,353,434 | Stuart | Sept. 21, 1920 |
| 2,034,275 | Tarbox | Mar. 17, 1936 |
| 2,055,031 | Hutchings | Sept. 22, 1936 |
| 2,331,639 | Tigerstedt | Oct. 12, 1943 |
| 2,354,391 | McCourt | July 25, 1944 |
| 2,391,718 | Lindemann | Dec. 25, 1945 |

UNITED STATES PATENT OFFICE

CERTIFICATE OF CORRECTION

Patent No. 2,932,779　　　　　　　　　　　　　April 12, 1960

William J. Tancig

It is hereby certified that error appears in the printed specification of the above numbered patent requiring correction and that the said Letters Patent should read as corrected below.

Column 5, line 72, strike out "A" and insert instead an opening parenthesis; column 8, line 1, for "a circle to" read -- the circle of --.

Signed and sealed this 4th day of October 1960.

(SEAL)
Attest:

KARL H. AXLINE
Attesting Officer

ROBERT C. WATSON
Commissioner of Patents